United States Patent
Hashimoto (10) Patent No.: US 12,049,217 B2
(45) Date of Patent: Jul. 30, 2024

(54) PARKING SUPPORT DEVICE

(71) Applicant: TOYOTA JIDOSHA KABUSHIKI KAISHA, Toyota (JP)

(72) Inventor: Tatsuya Hashimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 242 days.

(21) Appl. No.: 17/864,801

(22) Filed: Jul. 14, 2022

(65) Prior Publication Data

US 2023/0066522 A1   Mar. 2, 2023

(30) Foreign Application Priority Data

Aug. 31, 2021 (JP) ................. 2021-141072

(51) Int. Cl.
*B60W 30/06*   (2006.01)
*B60W 10/04*   (2006.01)
*B60W 10/10*   (2012.01)
*B60W 10/18*   (2012.01)

(52) U.S. Cl.
CPC ............ *B60W 30/06* (2013.01); *B60W 10/04* (2013.01); *B60W 10/10* (2013.01); *B60W 10/18* (2013.01); *B60W 2556/45* (2020.02)

(58) Field of Classification Search
CPC ...... B60W 30/06; B60W 10/04; B60W 10/10; B60W 10/18; B60W 2556/45; B60W 10/182
See application file for complete search history.

(56) References Cited

U.S. PATENT DOCUMENTS 11,393,340 B2 *  7/2022  Kim ................. G08G 1/143
2018/0022329 A1   1/2018  Sannodo

FOREIGN PATENT DOCUMENTS

DE   102015209976 A1   1/2016
JP   2018-012456 A     1/2018

* cited by examiner

*Primary Examiner* — Michael V Kerrigan
(74) *Attorney, Agent, or Firm* — Sughrue Mion, PLLC (57) ABSTRACT

A parking support device includes a parking support control device mounted on an own vehicle. The parking support control device is configured to be able to receive an operation signal in a state where the driver gets off the own vehicle, and executes parking support control such that the own vehicle moves along a movement route according to the received operation signal. The parking support control device controls the drive device and the foot brake device such that the own vehicle travels at a speed at which a shift position can be switched to a parking position. The parking support control device can execute a shift switching process during execution of the parking support control, and when a switching destination of the shift position is a position other than the parking position, the parking brake device is operated to apply braking force to the wheels and switch the shift position.

2 Claims, 6 Drawing Sheets

| MOVEMENT ROUTE | P0 | P1 | P2 | ... | P5 | P6 | P7 | ... | PK |
|---|---|---|---|---|---|---|---|---|---|
| SHIFT PATTERN | PP→DP | | | | DP→RP | | | | RP→PP |
| SPEED PATTERN | MOVING FORWARD ↑ / MOVING REARWARD ↓ | | | | | | | | |
| STEERING ANGLE PATTERN | RIGHT ↑ / LEFT ↓ | | | | | | | | |

| MOVEMENT ROUTE | P0 | P1 | P2 | ... | P5 | P6 | P7 | ... | PW |
|---|---|---|---|---|---|---|---|---|---|
| SHIFT PATTERN | PP→DP | | | | DP→RP | | | | RP→PP |
| SPEED PATTERN | MOVING FORWARD / MOVING REARWARD | | | | | | | | |
| STEERING ANGLE PATTERN | RIGHT / LEFT | | | | | | | | |

PARKING SUPPORT DEVICE

CROSS-REFERENCE TO RELATED APPLICATION

This application claims priority to Japanese Patent Application No. 2021-141072 filed on Aug. 31, 2021, incorporated herein by reference in its entirety.

BACKGROUND

1. Technical Field

The present disclosure relates to a parking support device that executes parking support control for causing a vehicle to enter and/or leave a predetermined place.

2. Description of Related Art

Conventionally, a parking support device has been proposed in which a target around a vehicle is detected using a surrounding sensor such as a "camera, sensor, etc." mounted on the vehicle, a parking area is determined based on the detected target, and parking support control for causing the vehicle to autonomously travel to and park in the parking area is executed (see, for example, German Patent No. 102015209976).

According to the device proposed in German Patent No. 102015209976 (hereinafter referred to as a "conventional device"), the parking support control can be executed in a state where a driver gets off the vehicle. Such control is also referred to as "remote parking support control". When the driver operates a remote controller from outside the vehicle, the remote controller transmits a signal corresponding to an operation of the driver to an electronic control unit (ECU) of the vehicle through a wireless communication line. Upon receiving the above signal, the ECU determines whether various devices (engine, brake, power supply device, etc.) for causing the vehicle to autonomously travel to a predetermined parking area are normal. Then, when all the devices to be determined are normal, the ECU starts autonomous traveling of the vehicle.

SUMMARY

Here, after the conventional device starts to cause the vehicle to travel to the parking area, an abnormality may occur in a braking device of the vehicle before the vehicle reaches the parking area. Even when such a situation occurs, it is necessary to brake the vehicle, but the conventional device does not have measures for that purpose.

One of the objects of the present disclosure is to provide a parking support device capable of improving safety of the vehicle during remote parking support control.

In order to achieve the above object, a parking support device (1) of the present disclosure includes
- a drive device (20) that applies drive force to a drive wheel of wheels of an own vehicle;
- a foot brake device (32) and a parking brake device (33) that apply braking force to the wheels;
- a shift switching device (40) that switches a shift position of a transmission of the own vehicle to one of multiple positions including a forward position (DP), a reverse position (RP), and a parking position (PP);
- a steering device (50) that controls steering angle of a steered wheel of the wheels, and a parking support control device (10) mounted on the own vehicle, the parking support control device (10) being configured to be able to receive an operation signal generated from a mobile device (70) a driver operates in a state where the driver gets off the own vehicle through a wireless communication line and executing parking support control for controlling the drive device, the foot brake device, the shift switching device, and the steering device such that the own vehicle moves along a movement route on which the own vehicle is able to move from a position of the own vehicle at a current point to a predetermined target position according to the received operation signal.

The parking support control device is configured to
- be able to execute a shift switching process for switching the shift position during execution of the parking support control, and
- switch the shift position after the parking brake device is operated and the braking force is applied to the wheels when a switching destination of the shift position is a position other than the parking position in the shift switching process.

In the conventional device, an abnormality may occur in the foot brake device while the shift position is being switched to, for example, the forward position or the reverse position during remote parking support control. In that case, there is a possibility that the vehicle will unintentionally move forward or rearward due to a gradient (posture of the vehicle with respect to a horizontal plane (height difference between the front end and the rear end of the vehicle)), a creep phenomenon, or the like. In the parking support device according to the present disclosure, the parking brake is operated to brake the vehicle before the shift position is started to be switched to a position other than the parking position. Therefore, even when an abnormality occurs in the foot brake when the shift position is switched as described above, it is possible to suppress the vehicle from unintentionally moving forward or rearward excessively. Therefore, when the parking support device according to the present disclosure is adopted, safety of the vehicle during remote parking support control can be improved.

In the parking support device according to an embodiment of the present disclosure,
the parking support control device is configured to
switch the shift position after the parking brake device is operated and the braking force is applied to the wheels when any one of a switching operation from the forward position to the reverse position, a switching operation from the reverse position to the forward position, and a switching operation from the parking position to another position is started in the shift switching process, and a gradient ($\alpha$) is equal to or larger than a predetermined threshold value ($\alpha$th).

While the shift switching device is switching a shift position from a current position to another position (first position), the parking support control device may transmit a command for switching the shift position to a second position different from the first position to the shift switching device. For example, when an abnormality occurs in the foot brake device, the above command is transmitted in order to brake the vehicle. However, similarly to a general shift switching device, the shift switching device according to the present disclosure cannot cancel the switching operation to the first position and switch the shift position to the second position. For example, even when the above urgent shift switching command is transmitted while the shift position is being switched to the forward position or the reverse position, the shift switching device switches the shift position to the parking position PP after switching to the forward position or the reverse position is completed. Therefore, it takes a relatively long time until switching to the parking position PP is completed. For example, it is assumed that an abnormality occurs in the foot brake device while the shift position is switched to the forward position or the reverse position in a state where the gradient (for example, height difference between the front end and the rear end of the vehicle) of the vehicle to which the conventional device is applied is relatively large. In this case, the parking support control device immediately tries to start to switch the shift position to the parking position, but in this case, as described above, it takes a relatively long time before the process is completed. Therefore, during the time, the vehicle may accelerate to the lower side of the gradient due to its own weight, and the vehicle speed may exceed the upper limit value of the speed at which the shift position can be switched to the parking position. In that case, the shift position cannot be switched to the parking position. When a shift switching device having a high shift position switching speed is adopted, it may be possible to complete switching the shift position to the parking position before the vehicle speed exceeds the above upper limit value. However, in general, such a shift switching device is expensive.

With the parking support device according to the present disclosure, even when an abnormality occurs in the foot brake device while the shift position is switched to the forward position or the reverse position in a state where the gradient of the vehicle is relatively large, and the braking of the vehicle by the foot brake device is released, the vehicle is braked by the parking brake device. That is, the vehicle does not move forward or rearward to the lower side of the gradient. Therefore, even when it takes some time to switch the shift position to the parking position, switching to the parking position PP can be surely completed. As a result, not only the vehicle is braked by the parking brake device, but also the vehicle is braked by a transmission (regulation of gear rotation by a pin). Therefore, when the parking support device according to the present disclosure is adopted, safety of the vehicle during remote parking support control can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Structure

Figure 1:
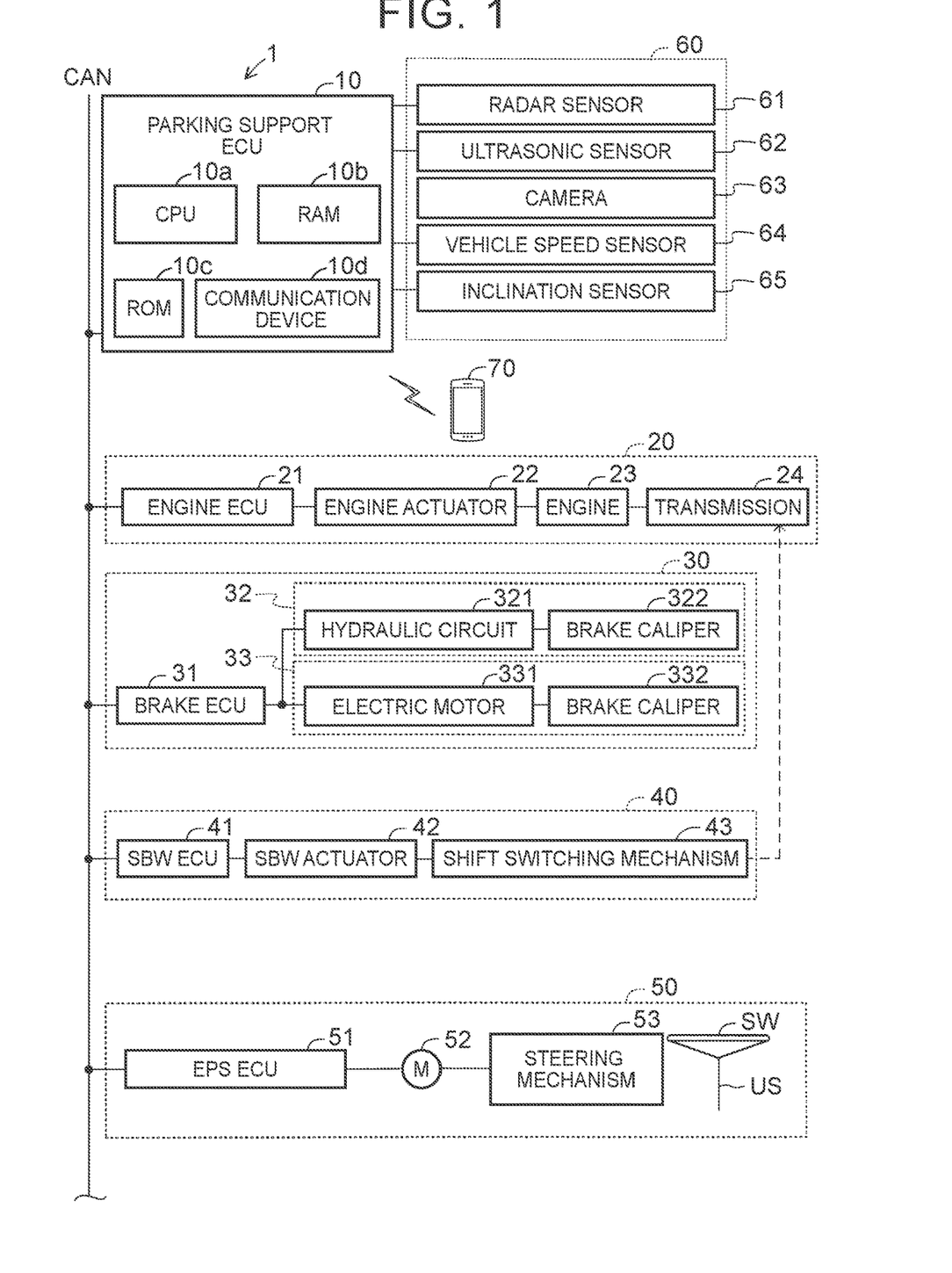
FIG. 1 is a block diagram of a parking support device according to an embodiment of the present disclosure.

A parking support device 1 according to an embodiment of the present disclosure is applied to a vehicle. The vehicle equipped with the parking support device 1 may be referred to as an "own vehicle" in order to distinguish the vehicle from other vehicles. As shown in FIG. 1, the parking support device 1 includes a parking support electronic control unit (ECU) 10, a drive device 20, a braking device 30, a shift switching device 40, a steering device 50, a surrounding sensor 60, and a mobile device 70.

The parking support ECU 10 includes a microcomputer including a central processing unit (CPU) 10a, a random access memory (RAM) 10b, a read-only memory (ROM) 10c, and the like. In the present specification, "ECU" means an electronic control unit, and includes a microcomputer including a CPU, RAM, ROM and the like. The CPU realizes various functions by executing instructions stored in the ROM.

The parking support ECU 10 is connected to other ECUs (engine ECU 21, brake ECU 31, steering by wire (SBW) ECU 41, and electric power steering (EPS) ECU 51 to be described below) via controller area network (CAN) so as to be able to transmit and receive information with each other.

Further, the parking support ECU 10 includes a communication device 10d. The communication device 10d is configured to be able to transmit and receive information to and from a mobile device 70 described below through a wireless communication line.

The drive device 20 generates drive force and applies the drive force to drive wheels of wheels (left front wheel, right front wheel, left rear wheel, and right rear wheel).

The drive device 20 includes an engine ECU 21, an engine actuator 22, an internal combustion engine 23, a transmission 24, a drive force transmission mechanism (not shown) for transmitting the drive force to the wheels, and the like. The engine ECU 21 is connected to the engine actuator 22. The engine actuator 22 includes a throttle valve actuator that changes the opening degree of a throttle valve of the internal combustion engine 23. The engine ECU 21 can change torque generated by the internal combustion engine 23 by driving the engine actuator 22. The torque generated by the internal combustion engine 23 is transmitted to the drive wheels via the transmission 24 and the drive force transmission mechanism (for example, a drive shaft). As described above, the engine ECU 21 controls the drive force of the vehicle by controlling the engine actuator 22.

When the vehicle to which the parking support device 1 is applied is a hybrid electric vehicle (HEV, PEHV) or a battery electric vehicle (BEV) including a transmission, the engine ECU 21 can control the drive force of the vehicle generated by either one or both of the "internal combustion engine and motor" as a vehicle drive source.

The braking device 30 applies braking force to the wheels. The braking device 30 includes a brake ECU 31, a foot brake mechanism 32, and a parking brake mechanism 33. The brake ECU 31 is connected to the foot brake mechanism 32 and the parking brake mechanism 33, and controls both mechanisms.

The foot brake mechanism 32 includes a hydraulic circuit 321 and a brake caliper 322. The hydraulic circuit 321 includes a reservoir, an oil pump, various valve devices, a hydraulic sensor, and the like (not shown). The brake caliper 322 is a hydraulic actuator equipped with a cylinder and a piston. When oil is supplied to the cylinder, a piston is pushed out of the cylinder. A brake pad is provided at the tip of the piston, and this brake pad is pressed against a brake disc. The hydraulic circuit 321 adjusts hydraulic pressure in the cylinder of the brake caliper 322 in response to an instruction from the brake ECU 31. As a result, the braking force to the wheels (brake disc) by the brake caliper 322 is controlled. The brake ECU 31 mainly controls the hydraulic circuit 321 when the vehicle travels to control the braking force of the vehicle.

The parking brake mechanism 33 includes an electric motor 331 and a brake caliper 332. The brake caliper 332 is an electric actuator provided with a power conversion mechanism that converts a rotary motion of an output shaft of the electric motor 331 into a linear motion. Electric power is supplied to the electric motor 331, and an output unit of the power conversion mechanism moves linearly toward a brake disc (or drum). A brake pad is provided at the tip of the output unit, and this brake pad is pressed against the brake disc (or drum). The brake ECU 31 controls the electric power supplied to the electric motor 331. As a result, the braking force to the wheels (brake disc (or drum)) by the brake caliper 332 is controlled. The brake ECU 31 mainly controls the electric power supplied to the electric motor 331 when the vehicle is stopped to control the braking force of the vehicle.

The shift switching device 40 switches the shift position of the transmission 24. In this example, the shift position includes a parking position PP, a forward position DP and a reverse position RP. In the parking position PP, a pin is locked to a predetermined gear of multiple gears constituting the transmission 24. Therefore, the drive shaft and the drive wheels cannot rotate. That is, in this state, the vehicle is braked. In the forward position DP, the drive force of the drive device 20 is transmitted to the drive shaft and the drive wheels as the drive force for moving the vehicle forward. In the reverse position RP, the drive force of the drive device 20 is transmitted to the drive shaft and the drive wheels as the drive force for moving the vehicle rearward.

The shift switching device 40 includes an SBW ECU 41, an SBW actuator 42, a shift switching mechanism 43, and the like. The SBW ECU 41 is connected to the SBW actuator 42. The SBW actuator 42 controls the shift switching mechanism 43 in response to a shift switching command from the SBW ECU 41 to switch the shift position of the transmission 24.

The steering device 50 controls the steering angles of the steered wheels (left front wheel and right front wheel) of the wheels. The steering device 50 includes an electric power steering ECU (hereinafter referred to as an "EPS ECU") 51, an assist motor (M) 52, and a steering mechanism 53. The EPS ECU 51 is connected to the assist motor 52 (drive circuit of the assist motor 52). The assist motor 52 is incorporated in the steering mechanism 53. The steering mechanism 53 is a mechanism for turning the steered wheels in response to the rotation operation of a steering handle SW. The steering mechanism 53 includes the steering handle SW, a steering shaft US connected to the steering handle SW, a steering gear mechanism (not shown), and the like. The EPS ECU 51 detects steering torque a driver inputs to the steering handle SW by a steering torque sensor (not shown) provided on the steering shaft US, and drives the assist motor 52 based on the steering torque. The EPS ECU 51 applies the steering torque (steering assist torque) to the steering mechanism 53 by driving the assist motor 52, whereby the steering operation of the driver can be assisted.

In addition, when the EPS ECU 51 receives a steering command from the parking support ECU 10 via the CAN during execution of the remote parking support control described below, the EPS•ECU 51 drives the assist motor 52 based on the steering torque specified by the steering command. This steering torque is different from the steering assist torque applied in order to assist a steering operation of the driver described above, and indicates torque applied to the steering mechanism 53 by the steering command from the parking support ECU 10 without requiring the steering operation of the driver. This torque changes the steering angle of the vehicle.

The surrounding sensor 60 acquires vehicle surrounding information including information on a three-dimensional object existing around the vehicle and information on a lane marking on a road surface around the vehicle. The three-dimensional object is, for example, a moving object such as an automobile, a pedestrian, and a bicycle, and a stationary object such as a guardrail and a fence.

The surrounding sensor 60 includes a radar sensor 61, an ultrasonic sensor 62, and a camera 63. The vehicle does not need to include all of the radar sensor 61, the ultrasonic sensor 62, and the camera 63 as a device for acquiring the vehicle surrounding information, and may include at least one of the radar sensor 61, the ultrasonic sensor 62, and the camera 63.

The radar sensor 61 includes a radar transmission and reception unit and a signal processing unit (not shown). The radar transmission and reception unit radiates radio waves in the millimeter wave band (hereinafter referred to as a "millimeter wave") to the surrounding area of the vehicle, and receives the millimeter wave reflected by a three-dimensional object existing within a radiation range (that is, the reflected wave). The signal processing unit acquires information indicating a distance between the vehicle and the three-dimensional object, a relative speed between the vehicle and the three-dimensional object, a relative position (direction) of the three-dimensional object with respect to the vehicle, and the like based on a phase difference between the transmitted millimeter wave and the received reflected wave, an attenuation level of the reflected wave, the time from the transmission of the millimeter wave to the reception of the reflected wave, and the like, and outputs the information to the parking support ECU 10.

The ultrasonic sensor 62 transmits ultrasonic waves in a pulse shape to a predetermined range around the vehicle, and receives the reflected wave reflected by the three-dimensional object. The ultrasonic sensor can detect "a reflection point that is a point on the three-dimensional object by which the transmitted ultrasonic waves are reflected", "a distance between the ultrasonic sensor and the three-dimensional object", and the like based on the time from the transmission of the ultrasonic waves to the reception of the reflected waves.

The camera 63 is, for example, a digital camera having a built-in image sensor of a charge coupled device (CCD) or a complementary metal oxide semiconductor (CMOS) image sensor (CIS). The camera 63 outputs image data of the surrounding area of the vehicle at a predetermined frame rate. The camera 63 captures an image of the surrounding area of the vehicle to be recognized when the vehicle enters or leaves a parking area, and outputs the obtained image data to the parking support ECU 10.

Further, the surrounding sensor 60 includes a vehicle speed sensor 64. The vehicle speed sensor 64 includes a wheel speed sensor that generates one pulse signal (wheel pulse signal) each time the wheels of the own vehicle rotate by a predetermined angle. The vehicle speed sensor 64 measures the number of pulses in a unit time of the wheel pulse signal transmitted from the wheel speed sensor, calculates a rotation speed (wheel speed) of each wheel based on the measured number of pulses, and calculates a vehicle speed Vs (actual vehicle speed) of the own vehicle based on the wheel speed of each wheel. The vehicle speed sensor 64 transmits data representing the vehicle speed Vs to the parking support ECU 10.

In addition, the surrounding sensor 60 includes an inclination sensor 65. The inclination sensor 65 is composed of, for example, an acceleration sensor that detects acceleration in the front-rear direction of the vehicle, acceleration in the right-left direction of the vehicle, and acceleration in the height direction of the vehicle. The inclination sensor 65 calculates a gradient $\alpha$ based on the acceleration detected by the acceleration sensor. The inclination sensor 65 transmits data representing the gradient $\alpha$ to the parking support ECU 10. The gradient $\alpha$ corresponds to, for example, the height difference between the midpoint of the line segment connecting the centers of the right and left front wheels and the midpoint of the line segment connecting the centers of the right and left rear wheels. When the midpoint on the front side is higher than the midpoint on the rear side, the gradient $\alpha$ is a positive value, and when the midpoint on the front side is lower than the midpoint on the rear side, the gradient $\alpha$ is a negative value.

The parking support ECU 10 receives a detection signal from each of the radar sensor 61 and the ultrasonic sensor 62 each time a predetermined time (for convenience, also referred to as a "first predetermined time" in the following description) elapses. The parking support ECU 10 plots information included in the detection signal (that is, the position of the reflection point that is a point where the millimeter wave is reflected and the position of the reflection point that is a point where the ultrasonic wave is reflected) on a two-dimensional map. This two-dimensional map is a plan view with the position of the vehicle as the origin, the forward travel direction of the vehicle as the X axis, and the left direction of the vehicle as the Y axis. The "position of the vehicle" is a predetermined center position (for example, center of gravity) in the plan view of the vehicle. The parking support ECU 10 detects the three-dimensional object around the vehicle based on the shape formed by a group of reflection points in the two-dimensional map, and specifies the position (distance and orientation) and the shape of the three-dimensional object with respect to the vehicle.

Further, the parking support ECU 10 acquires image data from the camera 63 each time the first predetermined time elapses. The parking support ECU 10 detects the three-dimensional object around the vehicle by analyzing the image data from the camera 63, and specifies (detects) the position (distance and orientation) and the shape of the three-dimensional object with respect to the vehicle.

The parking support ECU 10 adds information (position and shape) on the specified three-dimensional object to the above two-dimensional map.

The parking support ECU 10 parks the vehicle in a place designated by the driver (causes the vehicle to enter the place designated by the driver). At that time, the parking support ECU 10 detects an area around the vehicle in which the three-dimensional object does not exist, based on the information shown in the two-dimensional map. When the area where the three-dimensional object does not exist is an area having a size and a shape large enough to park the vehicle, the parking support ECU 10 determines the area as an "area where parking is allowed". When the lane marking that divides the parking area is detected around the vehicle, the area where parking is allowed is a rectangle that does not cross the lane marking, and the long side thereof is longer than the total length (length in the front-rear direction) of the vehicle by a first margin, and the short side thereof is wider than the total width (width in the right-left direction) of the vehicle by a second margin.

Further, the parking support ECU 10 moves the vehicle from the place where the vehicle is parked to the vicinity of the area where parking is allowed, stops the vehicle (causes the vehicle to leave the place where the vehicle is parked), and waits until the driver gets on the vehicle. At that time, the parking support ECU 10 detects an area around the vehicle in which the three-dimensional object does not exist, based on the information shown in the two-dimensional map. When the area where the three-dimensional object does not exist is an area having a size and a shape large enough to park the vehicle, the parking support ECU 10 determines the area as an "area where waiting is allowed".

The mobile device 70 is, for example, a smartphone. Software for remote parking support control (hereinafter referred to as a "remote parking application") is installed in the mobile device 70. The driver operates the mobile device 70 (touch panel) with the remote parking application activated, and can transmit a signal for causing the vehicle to travel (move forward or rearward) when the vehicle enters or leaves the parking area (hereinafter referred to as "progress permission signal") to the parking support ECU 10 through the wireless communication line. Further, the mobile device 70 can receive a display signal from the parking support ECU 10 through the wireless communication line and display various kinds of information related to the remote parking support control based on the display signal.

Remote Parking Support Control

Operation of Parking Support Device 1 When Vehicle Enters Parking Area

Figure 2A:
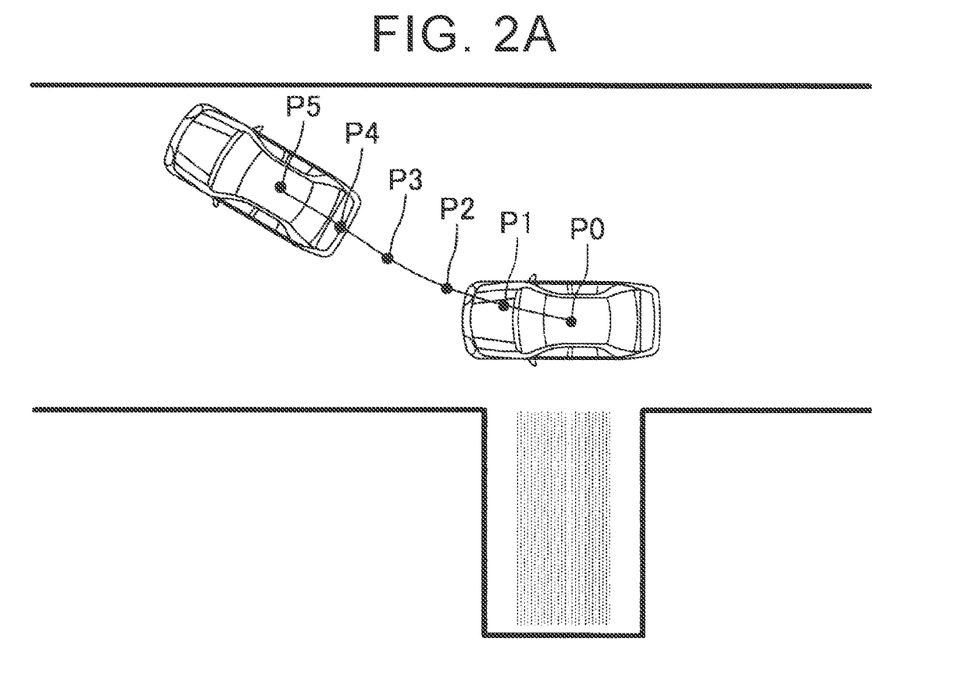
FIG. 2A is a plan view (two-dimensional map) showing a movement route ((A) first route) when a vehicle enters a parking area.

A process in which the parking support device 1 causes the vehicle to enter the parking area will be described. The driver drives the vehicle toward the destination and temporarily stops the vehicle in the vicinity of the place where the vehicle is to be parked. That is, the driver operates an operator (lever) to operate the parking brake mechanism 33, and switch the shift position to the parking position PP. Next, the driver activates the remote parking application installed in the mobile device 70. When the remote parking application is activated, the mobile device 70 displays an image (mode selection icon) for selecting either an entering mode or a leaving mode. When the driver selects the entering mode (taps the icon), the parking support ECU 10 transmits data representing the two-dimensional map and the area where parking is allowed to the mobile device 70. Then, as shown in FIG. 2A, the mobile device 70 superimposes and displays the area where parking is allowed (the area with halftone dots in FIG. 2A) on the two-dimensional map. In FIG. 2A, there is only one area where parking is allowed, but there may be multiple areas where parking is allowed.

When the driver selects the area where parking is allowed (taps the image of the area where parking is allowed), the parking support ECU 10 determines, as a "parking area", the area to be occupied by the vehicle when it is assumed that the vehicle is parked in the area where parking is allowed. Further, the parking support ECU 10 sets the position of the vehicle (the center position of the vehicle in a plan view) when the vehicle is parked in the parking area as the "parking position".

Figure 3:
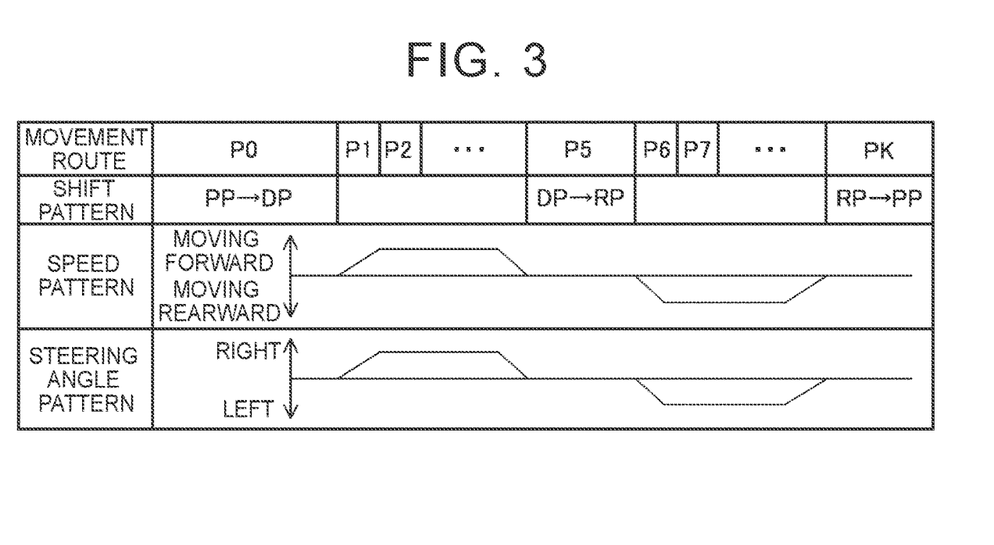
FIG. 3 is a table showing a travel plan when the vehicle enters the parking area.

Next, the parking support ECU 10 formulates a "travel plan" representing a travel mode of the vehicle from the initial position P0 of the vehicle to the parking position PK of the vehicle. As shown in FIG. 3, the travel plan includes a movement route, a shift pattern, a speed pattern, and a steering angle pattern.

The movement route is a route in which the vehicle can move from the initial position P0 to the parking position PK while a vehicle body of the vehicle keeps a predetermined distance from the three-dimensional object (other vehicles, curb, guardrail, etc.). For example, the parking support ECU 10 calculates multiple target positions P1, P2, . . . between the initial position P0 and the parking position PK (final target position). The parking support ECU 10 controls other ECUs such that the vehicle reaches the parking position PK from the initial position P0 through the target positions P1, P2, . . . in this order.

Figure 2B:
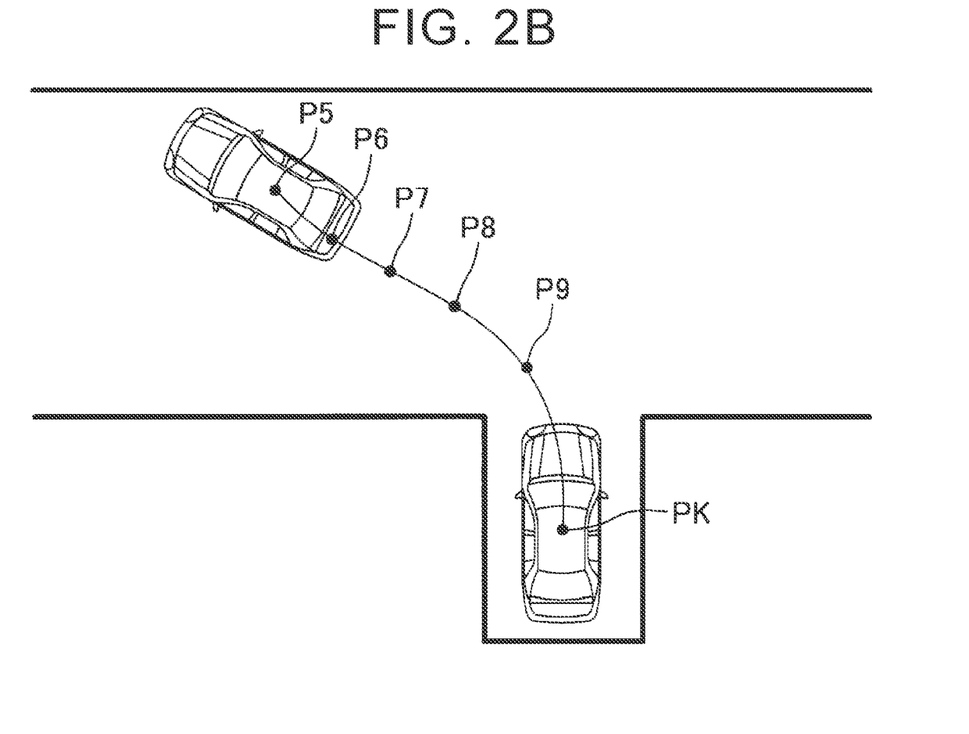
FIG. 2B is a plan view (two-dimensional map) showing a movement route ((B) second route) when the vehicle enters the parking area.

Here, when the vehicle cannot be moved to the parking position PK only by moving the vehicle forward or rearward from the initial position P0 only once, the parking support ECU 10 calculates the movement route as follows. For example, as shown in FIGS. 2A and 2B, and FIG. 3, the parking support ECU 10 calculates a target position Px (P5 in the example of FIGS. 2A and 2B, and FIG. 3) at which the travel direction is switched from the initial position P0. That is, in the example of FIGS. 2A and 2B, and FIG. 3, the target position P5 is a position at which the vehicle temporarily stops in order to switch the shift position of the transmission 24 from the forward position DP to the reverse position RP. Then, a first movement route (P0 to P5) for moving the vehicle forward to the target position P5 and a second movement route (P5 to PK) for moving the vehicle rearward from the target position P5 to the parking position PK are calculated. Although FIGS. 2A and 2B, and FIG. 3 show an example in which the travel direction needs to be switched only once, when it is necessary to switch the travel direction multiple times, the parking support ECU 10 calculates multiple target positions for switching the travel direction.

The shift pattern is data in which the target positions and the shift positions are associated with each other, and represents a change in the shift positions when the vehicle travels along the movement route. The parking support ECU 10 transmits a shift control command to the SBW ECU 41 via the CAN according to the determined shift pattern. When the SBW ECU 41 receives the shift control command from the parking support ECU 10, the SBW ECU 41 drives the SBW actuator 42 to change the shift position of the transmission 24 to the position specified by the shift control command (that is, shift switching control is executed).

The steering angle pattern is data in which the target positions and the steering angles are associated with each other, and represents a change in the steering angles when the vehicle travels along the movement route. The parking support ECU 10 transmits a steering command (including a target steering angle) to the EPS•ECU 51 via the CAN according to the determined steering angle pattern. When the EPS•ECU 51 receives the steering command from the parking support ECU 10, the EPS•ECU 51 drives the assist motor 52 based on the steering torque specified by the steering command to match the actual steering angle with the target steering angle (that is, steering angle control is executed).

The speed pattern is data in which the target positions and the travel speeds are associated with each other, and represents a change in the travel speeds when the vehicle travels along the movement route. The parking support ECU 10 transmits a drive force control command to the engine ECU 21 via the CAN according to the determined speed pattern. When the engine ECU 21 receives the drive force control command from the parking support ECU 10, the engine ECU 21 controls the engine actuator 22 according to the drive force control command (that is, drive force control is executed). Further, the parking support ECU 10 transmits a braking force control command to the brake ECU 31 according to the determined speed pattern. When the brake ECU 31 receives the braking force control command from the parking support ECU 10, the brake ECU 31 controls the hydraulic circuit 321 according to the braking force control command (that is, braking force control is executed).

By the way, as described above, in the state where the shift position is the parking position PP, the pin is locked to the predetermined gear constituting the transmission 24, and the drive wheels are in a non-rotatable state. That is, in this state, even when the foot brake mechanism 32 and the parking brake mechanism 33 are not operating, the vehicle is braked by the action of the transmission 24. Here, when the shift position is switched to the parking position PP, and the vehicle speed Vs is larger than the predetermined value (the rotation speed of the gear of the transmission 24 is larger than the predetermined value), not only it is difficult for the pin to be locked to the gear, but also the pin or the gear may be damaged. Therefore, the transmission 24 is configured such that the shift position can be switched to the parking position PP only when the vehicle speed Vs is equal to or less than a relatively small upper limit value. In the present embodiment, the speed pattern is determined such that the maximum value of the vehicle speed Vs when the vehicle enters the parking area is equal to or less than the threshold value VL slightly smaller than the above upper limit value (that is, the vehicle speed Vs when the vehicle enters the parking area is a speed at which the shift position can be switched to the parking position PP).

When the parking support ECU 10 determines the travel plan, the parking support ECU 10 causes the mobile device 70 to display the movement route (initial position P0 (current position), target positions P1, P2, . . . and parking position PK) and an image for causing the vehicle to start entering the parking area (entry start icon). The driver gets off the vehicle and taps the entry start icon. Then, the mobile device 70 displays an image (progress permission icon) for progressing the travel plan. The progress permission icon can be swiped in a predetermined direction (for example, upper side of the screen of the mobile device 70). In a state where the driver repeatedly swipes the progress permission icon in a predetermined direction at a frequency of three or more times per second, for example, the mobile device 70 keeps transmitting a progress permission signal for permitting progress of the travel plan to the parking support ECU 10 through the wireless communication line. The parking support ECU 10 controls the vehicle according to the travel plan while receiving the progress permission signal. When the driver temporarily stops swiping the progress permission icon before the vehicle reaches the parking position PK, the mobile device 70 stops transmitting the progress permission signal. Therefore, the parking support ECU 10 temporarily stops the progress of the travel plan. That is, the parking support ECU 10 temporarily stops the vehicle. Specifically, the parking support ECU 10 operates the foot brake mechanism 32 via the brake ECU 31 to brake the vehicle. Then, when the time during which the driver does not swipe the progress permission icon (the time during which the progress permission signal is not transmitted) exceeds a predetermined threshold value, the parking support ECU operates the parking brake mechanism 33 via the brake ECU 31, and operates the SBW actuator 42 via the SBW ECU 41 to switch the shift position to the parking position PP. When the driver starts swiping the progress permission icon again, the parking support ECU 10 resumes the progress of the travel plan. That is, the parking support ECU 10 releases the braking of the vehicle and starts to cause the vehicle to travel.

As described above, the parking support ECU 10 switches the shift position during execution of the travel plan. When the parking support ECU 10 switches the shift position while the vehicle is braked (stopped) by the foot brake mechanism 32, immediately before that, the parking support ECU 10 determines whether a switching destination of the shift position is a position other than the parking position. Specifically, the parking support ECU 10 determines whether a switching mode of the shift position is applicable to one of the following modes.

(A) From forward position DP to reverse position RP
(B) From reverse position RP to forward position DP
(C) From parking position PP to other positions (DP, RP)

When the switching mode of the shift position to be executed is applicable to one of the above modes, the parking support ECU 10 acquires the gradient α from the inclination sensor 65. When the magnitude (absolute value) of the gradient α exceeds a predetermined threshold value αth, the parking support ECU 10 operates the SBW actuator 42 and the shift switching mechanism 43 to switch the shift position to the target position after operating the parking brake mechanism 33 to complete the braking of the vehicle by the parking brake mechanism 33. Then, after the switching of the shift position is completed, the parking support ECU 10 releases the braking of the vehicle by the parking brake mechanism 33.

On the other hand, when the switching destination of the shift position is the parking position PP, the parking support ECU 10 brakes the vehicle by operating the parking brake mechanism 33 simultaneously with switching the shift position to the parking position PP, regardless of the gradient α.

When the parking support ECU 10 completes the travel plan (that is, the parking support ECU 10 causes the vehicle to reach and stop at the parking position PK and causes the parking brake mechanism 33 to brake the vehicle, and switches the shift position to the parking position PP), the parking support ECU 10 causes the mobile device 70 to display an image indicating that entry is completed (entry completion icon). When the driver taps the entry completion icon, the parking support ECU 10 stops the engine. Then, the mobile device 70 ends the execution of the parking support application.

By the way, the parking support ECU 10 monitors whether the foot brake mechanism 32 can normally operate while executing the travel plan. For example, the parking support ECU 10 determines whether the foot brake mechanism 32 can normally operate based on actual measured values such as the hydraulic pressure in the hydraulic circuit and the vehicle speed Vs with respect to the command value to the brake ECU 31. For example, when the measured value acquired from the hydraulic pressure sensor is significantly larger or significantly smaller than the magnitude of the hydraulic pressure assumed for the command value to the brake ECU 31 (command value for operating the foot brake mechanism 32), the parking support ECU 10 determines that an abnormality occurs in the foot brake mechanism 32. Further, for example, when the measured value (or change in the measured value) acquired from the vehicle speed sensor 64 is significantly larger or significantly smaller than the vehicle speed Vs (or change in the vehicle speed Vs) assumed for the command value to the brake ECU 31, the parking support ECU 10 determines that an abnormality occurs in the foot brake mechanism 32.

When the parking support ECU 10 determines that the abnormality occurs in the foot brake mechanism 32, the parking support ECU 10 immediately brakes the vehicle by operating the parking brake mechanism 33 simultaneously with switching the shift position to the parking position PP.

Next, with reference to FIG. 4, a process in which the CPU of the parking support ECU 10 (hereinafter, simply referred to as the "CPU") progresses the travel plan will be specifically described.

Figure 4:
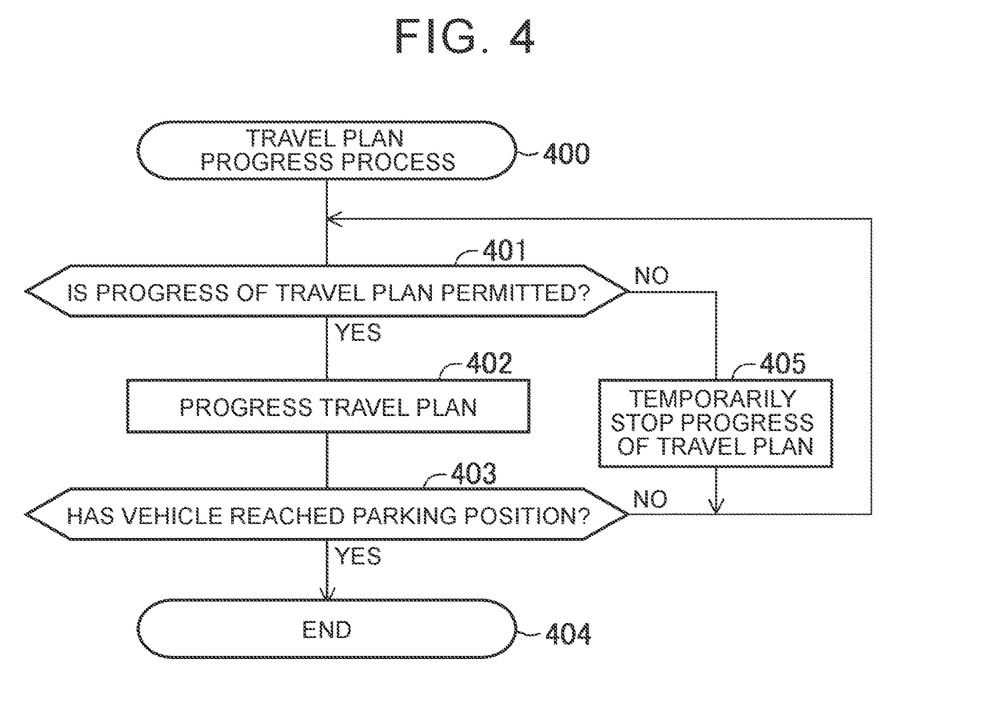
FIG. 4 is a flowchart of a travel plan progress program.

When the driver taps the entry start icon, the CPU starts executing the travel plan progress program shown in FIG. 4. The CPU starts a travel plan progress process from step 400. Next, in step 401, the CPU determines whether the progress of the travel plan is permitted. When the progress permission signal is received from the mobile device 70, the CPU determines that "progress of the travel plan is permitted" (step 401: Yes), and proceeds to step 402. Next, the CPU progresses the travel plan in step 402. That is, for example, the CPU moves the vehicle to the next target position. Further, for example, the CPU switches the shift position. When a predetermined time has elapsed from the start of step 402, the CPU proceeds to step 403.

Next, in step 403, the CPU determines whether the vehicle has reached the parking position PK. When the vehicle has reached the parking position PK (step 403: Yes), the CPU ends the travel plan progress process in step 404. On the other hand, when the vehicle has not yet reached the parking position PK (step 403: No) in step 403, the CPU returns to step 401.

When the progress permission signal is received from the mobile device 70, the CPU determines in step 401 that "progress of the travel plan is prohibited" (step 401: No), and proceeds to step 405. Then, in step 405, the CPU temporarily stops the progress of the travel plan. That is, the CPU operates the foot brake mechanism 32 (and the parking brake mechanism 33) to brake the vehicle, and returns to step 401.

The CPU causes the SBW ECU 41 to switch the shift position according to the shift pattern in a state where the progress of the travel plan is permitted. That is, when the CPU detects that the vehicle has reached the position where the shift position is changed with reference to the shift pattern, the CPU executes a shift switching program shown in FIG. 5. Further, even when an abnormality occurs in the foot brake mechanism 32, the CPU executes the shift switching program shown in FIG. 5.

Figure 5:
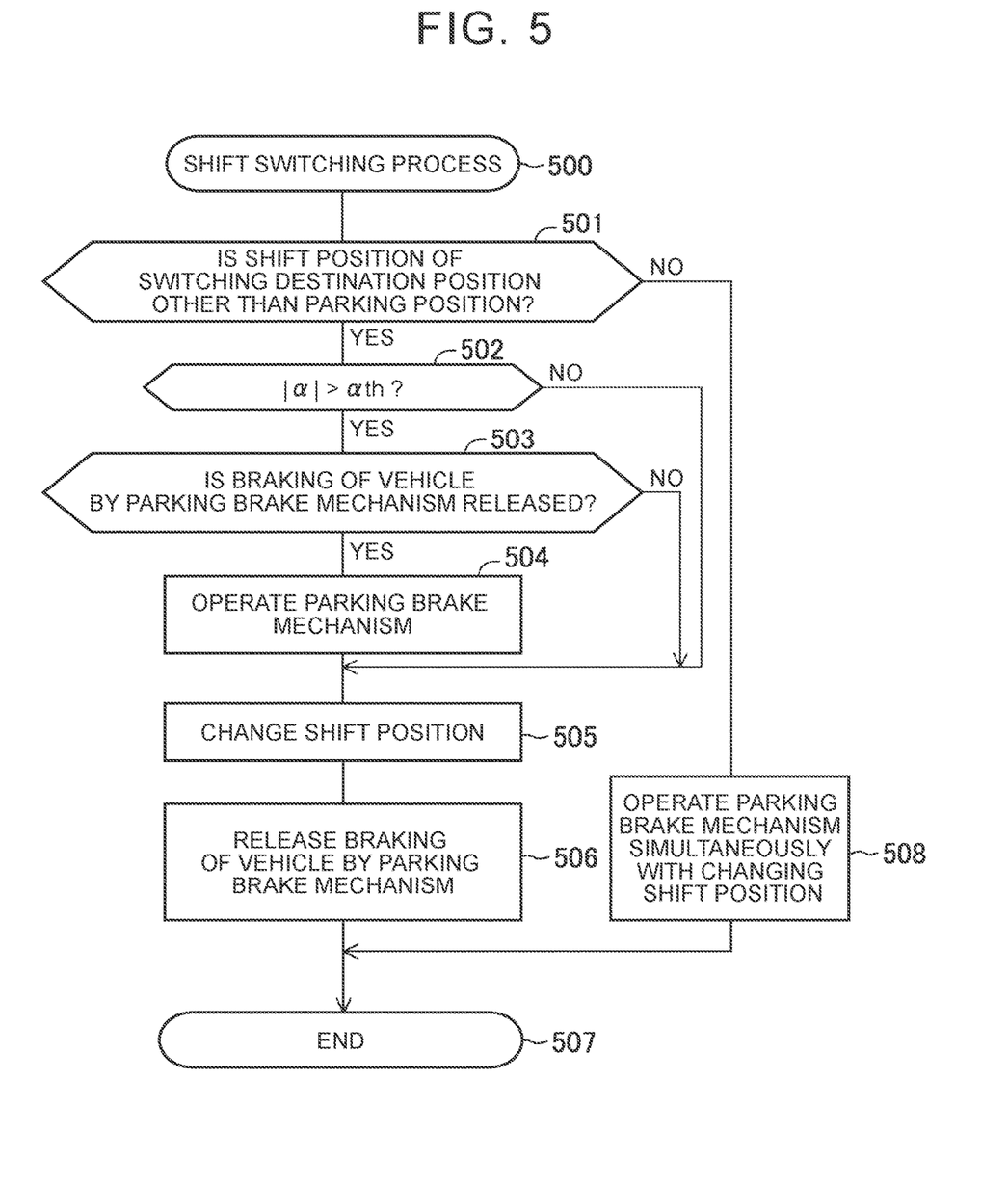
FIG. 5 is a flowchart of a shift switching program.

The CPU starts a shift switching process from step 500. Next, in step 501, the CPU determines whether the shift position of the switching destination is a position other than the parking position PP. When the shift position of the switching destination is a position other than the parking position PP (step 501: Yes), the CPU proceeds to step 502.

Next, in step 502, the CPU acquires data representing the gradient α from the inclination sensor 65, and determines whether the magnitude (absolute value) of the gradient α is larger than the threshold value αth. When the gradient α is larger than the threshold αth (step 502: Yes), the CPU proceeds to step 503.

Next, in step 503, the CPU determines whether the braking of the vehicle by the parking brake mechanism 33 is released. When the braking of the vehicle by the parking brake mechanism 33 is released (step 503: Yes), the CPU proceeds to step 504, operates the parking brake mechanism 33 to brake the vehicle, and proceeds to step 505.

When the CPU proceeds to step 505, the CPU causes the SBW ECU 41 to switch the shift position to a target position (a position other than the parking position PP). Next, the CPU releases the braking of the vehicle by the parking brake mechanism 33 in step 506, ends the shift switching process in step 507, and returns to the main routine (for example, FIG. 4).

When the shift position of the switching destination is the parking position PP in step 501, (step 501: No), the CPU proceeds to step 508, and in step 508 the CPU brakes the vehicle by operating the parking brake mechanism 33 simultaneously with switching the shift position to the target position (parking position PP). Then, the CPU proceeds to step 507.

Further, in step 502, when the magnitude of the gradient α is equal to or less than the threshold value αth, the CPU directly proceeds from step 502 to step 505. That is, when the shift position of the switching destination is a position other than the parking position PP, and the magnitude of the gradient α is equal to or less than the threshold value αth, the CPU switches the shift position without operating the parking brake mechanism 33.

Further, when the CPU proceeds to step 503, and the vehicle has been already braked by the parking brake mechanism 33 (for example, a position is switched from the parking position PP to other positions in order to cause the vehicle to start traveling again from the state where the vehicle is temporarily stopped), it is not necessary to execute step 504, so that the CPU directly proceeds from step 503 to step 505.

Operation of Parking Support Device 1 when Vehicle Leaves Parking Area

Figure 6A:
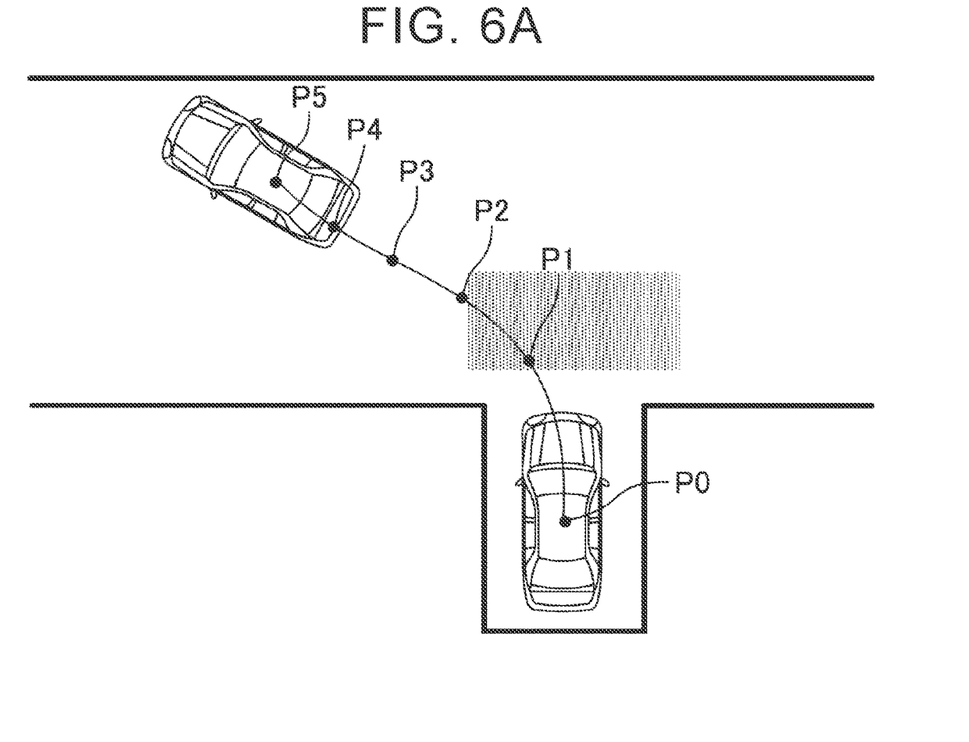
FIG. 6A is a plan view (two-dimensional map) showing a movement route ((A) first route) when a vehicle leaves a parking area.
Figure 6B:
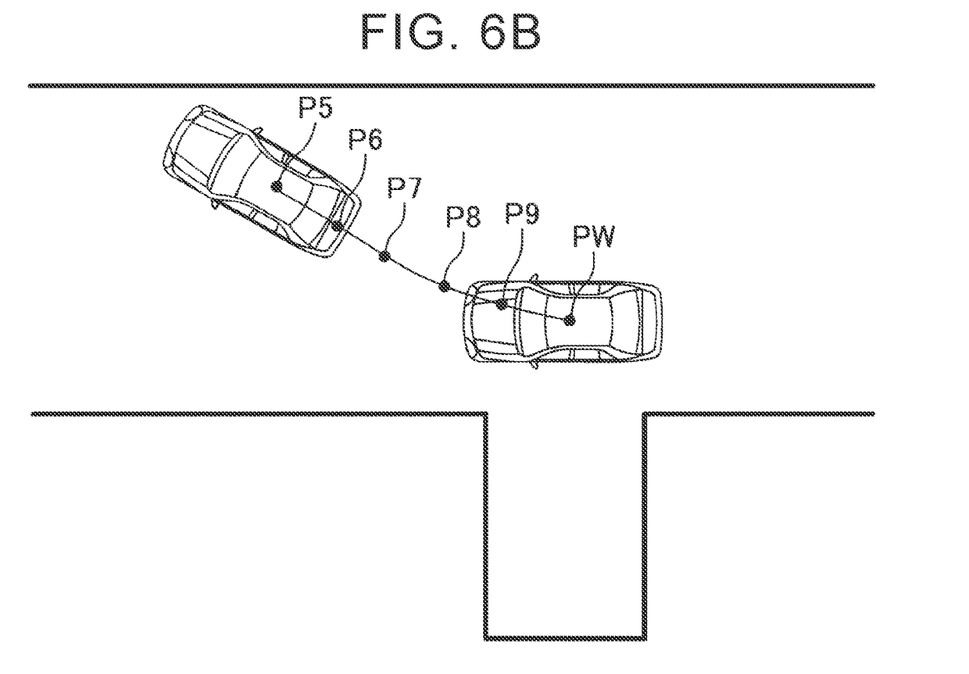
FIG. 6B is a plan view (two-dimensional map) showing a movement route ((B) second route) when the vehicle leaves the parking area.

A process in which the parking support device 1 causes the parked vehicle to leave the parking area and stop in the vicinity of the driver will be described. When the driver activates the remote parking application installed in the mobile device 70 and selects the leaving mode (taps the icon), the parking support ECU 10 starts the engine (internal combustion engine 23) of the own vehicle. Then, the parking support ECU 10 transmits the two-dimensional map and data representing the area where waiting is allowed to the mobile device 70. Then, as shown in FIG. 6A, the mobile device 70 superimposes and displays the area where waiting is allowed (the area with halftone dots in FIG. 6A) on the two-dimensional map.

When the driver selects one area where waiting is allowed, the parking support ECU 10 determines, as a "waiting area", the area to be occupied by the vehicle when it is assumed that the vehicle is stopped in the area where waiting is allowed. Further, the parking support ECU 10 sets the position of the vehicle (the center position of the vehicle in a plan view) when the vehicle is stopped in the waiting area as a "waiting position PW".

Figure 7:
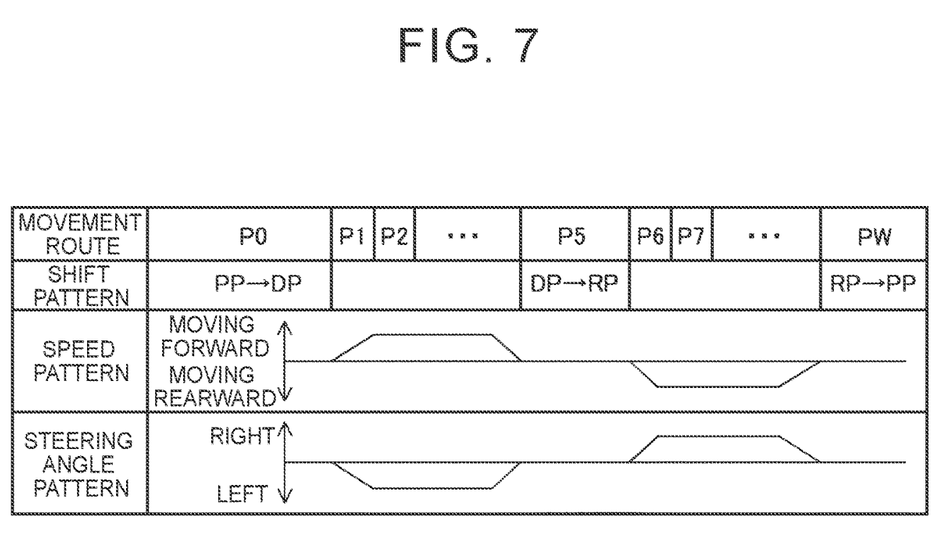
FIG. 7 is a table showing a travel plan when the vehicle leaves the parking area.

Subsequent operations of the parking support ECU 10 are the same as those at the time of entering the parking area. That is, as shown in FIG. 7, the parking support ECU 10 formulates a travel plan representing a travel mode of the vehicle from the initial position P0 of the vehicle (that is, the position where the vehicle is parked) to the waiting position PW of the vehicle, and causes the vehicle to travel according to the travel plan.

Effect

While the shift switching device 40 is switching the shift position from the current position to another position (first position), the parking support ECU 10 may transmit a command for switching the shift position to the second position different from the first position to SBW·ECU 41.

For example, when an abnormality occurs in the foot brake mechanism 32, the above command is transmitted in order to brake the vehicle. However, similarly to a general shift switching device, the shift switching device 40 according to the present embodiment cannot cancel the switching operation to the first position and switch the shift position to the second position. For example, even when the above urgent shift switching command is transmitted while the shift position is being switched to the forward position DP or the reverse position RP, the shift switching device 40 switches the shift position to the parking position PP after switching to the forward position DP or the reverse position RP is completed. Therefore, it takes a relatively long time until switching to the parking position PP is completed. For example, it is assumed that an abnormality occurs in the foot brake mechanism while the shift position is switched to the forward position or the reverse position in a state where the gradient of the vehicle to which the conventional device is applied is relatively large. In this case, the parking support ECU immediately transmits a command for switching the shift position to the parking position PP to the shift switching device 40. However, in this case, as described above, since the shift switching device 40 starts to switch the shift position to the parking position after switching to the forward position or the reverse position is completed, it takes a relatively long time until switching to the parking position PP is completed. Therefore, before the process is completed, the vehicle may accelerate to the lower side of the gradient due to its own weight, and the vehicle speed may exceed the upper limit value of the speed at which the shift position can be switched to the parking position. In that case, the shift position cannot be switched to the parking position. When a shift switching device having a high shift position switching speed is adopted, it may be possible to complete switching the shift position to the parking position before the vehicle speed exceeds the above upper limit value. However, in general, such a shift switching device is expensive.

According to the parking support device 1, even when an abnormality occurs in the foot brake mechanism 32 while the shift position is switched to the forward position DP or the reverse position RP in a state where the gradient is relatively large, and braking of the vehicle by the foot brake mechanism 32 is released, the vehicle is braked by the parking brake mechanism 33. That is, the vehicle does not move forward or rearward to the lower side of the gradient. Therefore, even when it takes some time to switch the shift position to the parking position PP, switching to the parking position PP can be surely completed. As a result, not only the vehicle is braked by the parking brake mechanism 33, but also the vehicle is braked by the transmission 24 (regulation of gear rotation by the pin). Therefore, when the parking support device 1 is adopted, the safety of the vehicle during remote parking support control can be improved.

The present disclosure is not limited to the above embodiment, and various modifications can be adopted within the scope of the present disclosure.

Modification

When the switching destination of the shift position is a position other than the parking position, the parking brake mechanism 33 may brake the vehicle before the shift position is started to be switched regardless of the value of the gradient α.

In the conventional device, an abnormality may occur in the foot brake mechanism 32 while the shift position is being switched to, for example, the forward position DP or the reverse position RP. In that case, even when the road surface is substantially horizontal, there is a possibility that the vehicle will unintentionally move forward or rearward due to a creep phenomenon. In the parking support device 1 according to the modification, the parking brake mechanism 33 is operated to brake the vehicle before the shift position is started to be switched to a position other than the parking position PP, regardless of the gradient α. Therefore, even when an abnormality occurs in the foot brake mechanism 32 when the shift position is switched as described above, it is possible to suppress the vehicle from unintentionally moving forward or rearward excessively. Therefore, when the parking support device 1 according to the modification is adopted, the safety of the vehicle during remote parking support control can be improved.

What is claimed is:

1. A parking support device comprising:
    a drive device that applies drive force to a drive wheel of wheels of an own vehicle;
    a foot brake device and a parking brake device that apply braking force to the wheels;
    a shift switching device that switches a shift position of a transmission of the own vehicle to one of multiple positions including a forward position, a reverse position, and a parking position;
    a steering device that controls steering angle of a steered wheel of the wheels; and
    a parking support control device mounted on the own vehicle, the parking support control device being configured to be able to receive an operation signal generated from a mobile device a driver operates in a state where the driver gets off the own vehicle through a wireless communication line and executing parking support control for controlling the drive device, the foot brake device, the shift switching device, and the steering device such that the own vehicle moves along a movement route on which the own vehicle is able to move from a position of the own vehicle at a current point to a predetermined target position according to the received operation signal, wherein the parking support control device is configured to
    be able to execute a shift switching process for switching the shift position during execution of the parking support control, and
    switch the shift position after the parking brake device is operated and the braking force is applied to the wheels when a switching destination of the shift position is a position other than the parking position in the shift switching process.

2. The parking support device according to claim 1, wherein the parking support control device is configured to switch the shift position after the parking brake device is operated and the braking force is applied to the wheels when any one of a switching operation from the forward position to the reverse position, a switching operation from the reverse position to the forward position, and a switching operation from the parking position to another position is started in the shift switching process, and a gradient is equal to or larger than a predetermined threshold value.

* * * * *